(12) United States Patent
Vanhee et al.

(10) Patent No.: US 12,419,221 B2
(45) Date of Patent: Sep. 23, 2025

(54) SIEVE FOR AN AGRICULTURAL HARVESTER INCLUDING EXTRUDED SIDES WITH POLYMERIC STRIPS

(71) Applicant: CNH Industrial America LLC, New Holland, PA (US)

(72) Inventors: Kris S. Vanhee, Deinze (BE); Michiel J. Vanderstichele, Merkem (BE); Jonas F.G. Deprauw, Lauwe (BE)

(73) Assignee: CNH Industrial America LLC, New Holland, PA (US)

( * ) Notice: Subject to any disclaimer, the term of this patent is extended or adjusted under 35 U.S.C. 154(b) by 758 days.

(21) Appl. No.: 17/748,251

(22) Filed: May 19, 2022

(65) Prior Publication Data

US 2022/0369560 A1  Nov. 24, 2022

(30) Foreign Application Priority Data

May 21, 2021 (EP) .................................... 21175435

(51) Int. Cl.
| | |
|---|---|
| *A01F 12/44* | (2006.01) |
| *A01D 41/12* | (2006.01) |
| *A01D 75/28* | (2006.01) |
| *A01F 12/34* | (2006.01) |

(52) U.S. Cl.
CPC ............ *A01F 12/446* (2013.01); *A01D 41/12* (2013.01); *A01D 75/282* (2013.01); *A01F 12/34* (2013.01); *A01F 12/448* (2013.01)

(58) Field of Classification Search
CPC ...... A01F 12/446; A01F 12/448; A01F 12/34; A01D 41/12; A01D 75/282
See application file for complete search history.

(56) References Cited

U.S. PATENT DOCUMENTS

| | | | |
|---|---|---|---|
| 3,081,874 A | 3/1963 | Corbin et al. | |
| 3,334,744 A * | 8/1967 | James | A01F 12/446 209/394 |
| 4,770,190 A * | 9/1988 | Barnett | A01F 12/446 209/394 |
| 5,041,059 A * | 8/1991 | Ricketts | A01F 12/446 460/902 |

(Continued)

FOREIGN PATENT DOCUMENTS

| | | | | |
|---|---|---|---|---|
| AT | 524317 B1 * | 5/2022 | ............. | D21F 1/483 |
| BR | 102016017233 A2 * | 1/2017 | ............. | A01D 41/12 |

(Continued)

OTHER PUBLICATIONS

Extended European Search Report for European Application No. 21175435.3, dated Nov. 9, 2021, 8 pages.

*Primary Examiner* — Arpad Fabian-Kovacs
(74) *Attorney, Agent, or Firm* — Buchanan Ingersoll & Rooney PC (57) ABSTRACT

A sieve for use in an agricultural harvester includes a framework with a pair of opposed side members. A plurality of overlapped louvres extend between the pair of opposed side members and are overlapped relative to each other. The opposed side members are each comprised of an extruded metal side member with a partially open elongate channel having a predefined cross section, and a polymeric strip having a mating cross section carried within the elongate channel.

17 Claims, 5 Drawing Sheets

(56) References Cited

U.S. PATENT DOCUMENTS

| | | | |
|---|---|---|---|
| 5,282,771 A * | 2/1994 | Underwood | A01D 75/282 |
| | | | 460/95 |
| 6,439,392 B1 | 8/2002 | Baltzer | |
| 9,198,359 B2 | 12/2015 | Adamson et al. | |
| 9,258,945 B2 | 2/2016 | Pearson et al. | |
| 10,362,735 B2 | 7/2019 | Schrattenecker | |
| 2006/0270473 A1 * | 11/2006 | Straeter | A01D 75/282 |
| | | | 460/99 |
| 2015/0087364 A1 * | 3/2015 | Adamson | A01F 12/446 |
| | | | 460/79 |
| 2015/0087365 A1 | 3/2015 | Pearson et al. | |

FOREIGN PATENT DOCUMENTS

| | | | | |
|---|---|---|---|---|
| DE | 1127135 B | | 4/1962 | |
| DE | 1757089 A1 * | | 3/1971 | A01F 12/446 |
| DE | 102020109810 A1 * | | 10/2021 | A01F 12/448 |
| EP | 0680251 B1 * | | 7/1998 | A01D 75/282 |
| EP | 0765989 B1 | | 7/1998 | |
| EP | 2861051 A1 | | 4/2015 | |
| EP | 3120685 A1 * | | 1/2017 | A01D 41/12 |
| GB | 2031302 A * | | 4/1980 | A01F 12/446 |
| GB | 2054335 A | | 2/1981 | |

* cited by examiner

SIEVE FOR AN AGRICULTURAL HARVESTER INCLUDING EXTRUDED SIDES WITH POLYMERIC STRIPS

CROSS-REFERENCE TO RELATED APPLICATION

This application claims priority to European Patent Application No. 21175435.3, filed May 21, 2021, the content of such application being incorporated by reference herein in its entirety.

BACKGROUND OF THE INVENTION

1. Field of the Invention

The present disclosure relates to a cleaning system used in an agricultural harvester, such as a combine, and, more particularly, to a sieve used in such a cleaning system.

2. Description of the Related Art

An agricultural harvester combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

A sieve typically includes a plurality of louvres extending cross-wise between the sides of the sieve, with the louvres including a plurality of fingers which are attached at their rear edge to respective wires. Depending on the crop being harvested, size of the kernels, amount of non-crop matter, etc, the louvre spacing (between the fingers) may need to be adjusted during operation. The wires at each end of the louvres extend through the sides of the sieve, and can be rotated using manual levers, etc, which in turn opens and closes the spacing between the adjacent rows of fingers. The sides of the sieve are typically formed from plate steel with holes through which the wires extend. The rotation of the wires in the holes of the plate steel can wear out the wires over time.

SUMMARY OF THE INVENTION

The present disclosure provides a sieve with extruded side members and a strip carried by and clamped into the respective side member. A plurality of aligned holes are formed through the strip and side members to carry the sieve wires with increased surface area and decreased friction, thereby increasing the operational life of the wires.

The disclosure in one form is directed to a sieve for use in an agricultural harvester, including a framework with a pair of opposed side members. A plurality of overlapped louvres extend between the pair of opposed side members and are overlapped relative to each other. The opposed side members are each comprised of an extruded metal side member with a partially open elongate channel having a predefined cross section, and a strip having a mating cross section carried within the elongate channel.

In another embodiment, the elongate channel has an open side and an opposing closed side, and the strip and the closed side each include a plurality of aligned holes extending generally orthogonally from the open side, and the plurality of louvres each include a wire and a plurality of fingers attached to the wire, the respective wires being rotatably carried within a corresponding one of the aligned holes.

In another embodiment, each of the plurality of aligned holes in the strip provide an increased surface area with low friction for rotatably carrying a respective one of the wires.

In another embodiment, the elongate channel includes a deformable lip extending between the closed side and the open side, with the deformable lip being compressed against the strip to hold the strip in place within the elongate channel.

In yet another embodiment, the elongate channel has a generally trapezoidal shaped cross section.

In yet another embodiment, each strip extends substantially a length of the corresponding elongate channel.

In yet another embodiment, the strip comprises a polyamide strip or a bronze strip.

In a further embodiment, the extruded metal side members comprise extruded aluminum side members.

In a further embodiment, the framework further includes a pair of cross members extending between the side members. A plurality of cast aluminum corner pieces respectively interconnect one of the side members with one of the cross members.

In a still further embodiment, a method of operating a sieve in an agricultural harvester uses the extruded metal side members and respective strips.

In a still further embodiment, a method of assembling a sieve inserts the strip, deforms the lip of the extruded side member and drills a plurality of aligned holes through both the strip and the extruded side member.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
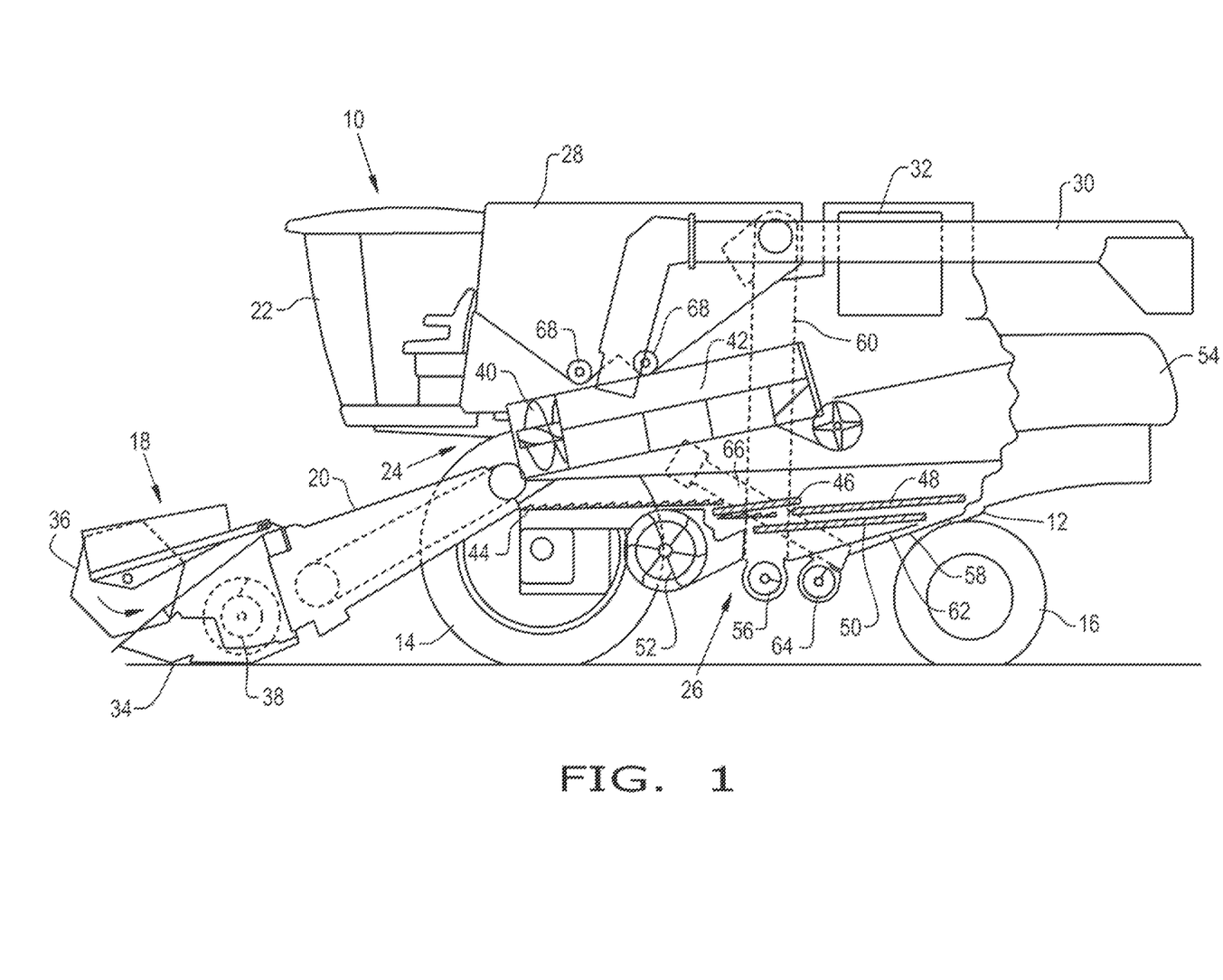
FIG. 1 is a side view of an embodiment of an agricultural harvester in the form of a combine which may include a cleaning system of the present disclosure.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. The upper sieve 48 and lower sieve 50 can be carried within a common framework, and are generally designated together as sieve assembly 100, which will be described in more detail hereinafter. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
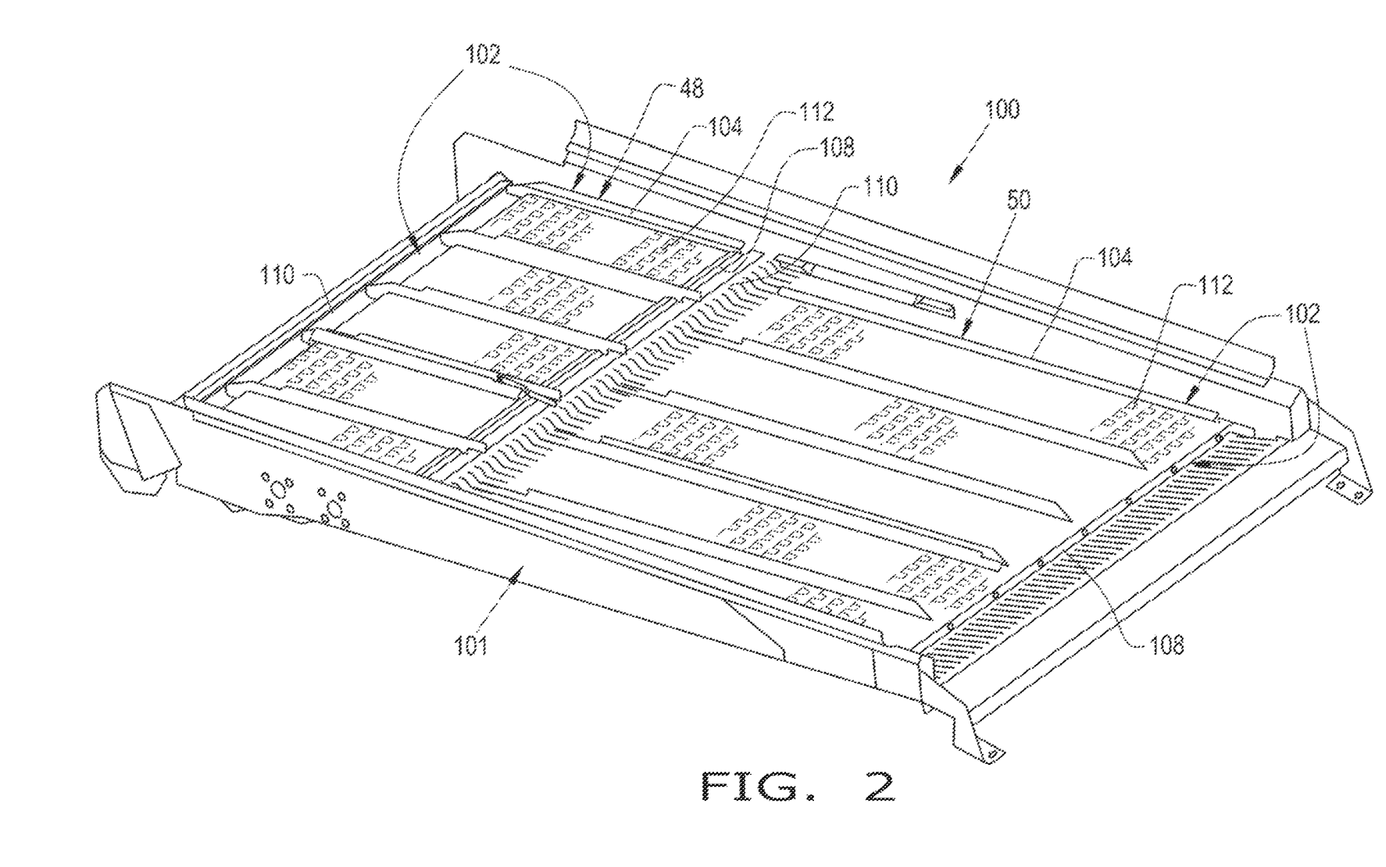
FIG. 2 is a perspective view of an embodiment of a sieve of the present disclosure which can be used in the harvester of FIG. 1.
Figure 3:
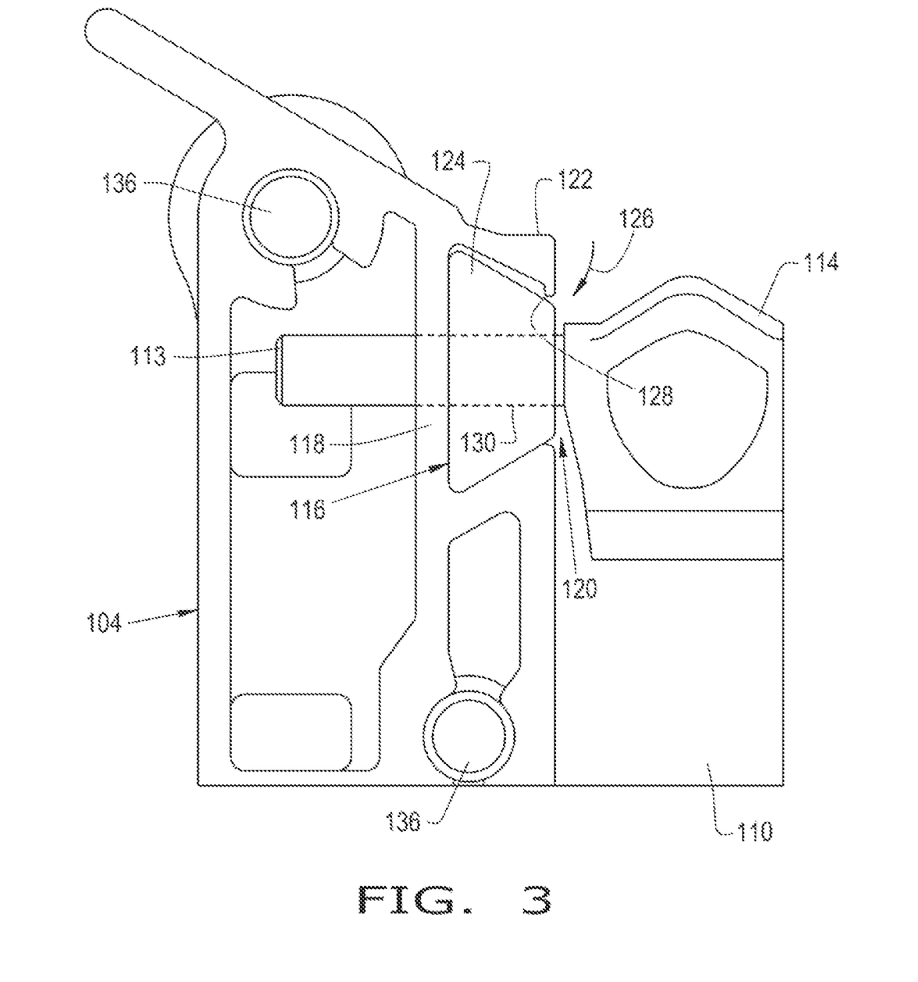
FIG. 3 is an end view of an embodiment of a side member and a strip used with the present disclosure.

Referring now to FIGS. 2 and 3, the sieve assembly 100 includes a cleaning shoe 101 in which the upper sieve 48 and lower sieve 50 can be removably installed. The upper sieve 48 and lower sieve 50 each generally include a framework 102 with a pair of opposed side members 104 (only one of which is visible for each sieve 48, 50 in FIG. 2). A first cross member 108 extends between the side members 104 at one end of the side members 104 and a second cross member 110 extends between the side members 104 at an opposite end of the side members 104. In the embodiment shown, the first cross member 108 is positioned at the downstream end of the sieve 48 or 50, and the second cross member 110 is positioned at the upstream end of the sieve 48 or 50.

The upper sieve 48 and the lower sieve 50 each include a plurality of louvres 112 (sometimes also referred to as wires) which extend between the pair of opposed side members 104. The louvres 112 are pivotally mounted at opposite ends to the side members 104.

The plurality of louvres 112 each include a wire 113 and a plurality of fingers 114 attached to the wire 113. The plurality of fingers 114 overlap relative to and can be offset from the fingers 114 of adjacent louvres. The spacing between the fingers 114 of adjacent louvres can be adjusted by simultaneously rotating the louvres within the side members 104.

The pair of opposed side members 104 (FIGS. 3 and 4) are each comprised of an extruded metal side member with a partially open elongate channel 116 having a predefined cross section. In the illustrated embodiment, the extruded metal side members 104 are formed as extruded aluminum side members, for reduced weight while retaining adequate strength. The elongate channel 116 can have a generally trapezoidal shaped cross section, with a closed side 118 and an open side 120. An elongate channel with a differently shaped cross section is also possible. The elongate channel 116 includes a deformable lip 122 extending between the closed side 118 and the open side 120, which will be described in more detail below.

A strip 124 (FIGS. 3 and 5) is carried within the elongate channel 116 and has a cross section which generally corresponds to and mates with the cross section of the elongate channel 116. The strip 124 is in an alternative material compared to the extruded metal side members 104, e.g. it can be a polymeric strip or another metal strip. The deformable lip 122 is compressed against the strip 124 to hold the strip 124 in place within the elongate channel 116. The deformable lip 122 can be bent against the strip 124, as indicated by directional arrow 126, and may include a distal projection 128 that assists with gripping the strip 124.

Figure 5:
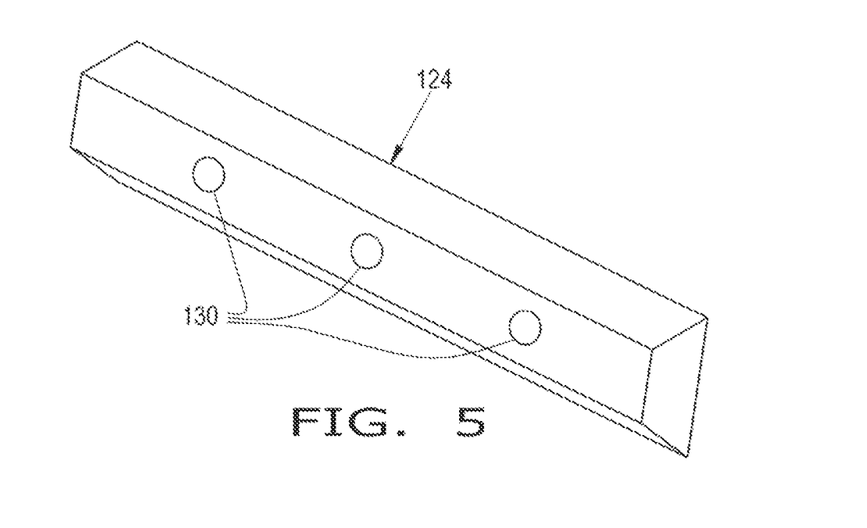
FIG. 5 is a perspective view of a portion of the strip shown in FIG. 3.

In the illustrated embodiment, the strip 124 is configured as a polyamide strip providing suitable wear resistance and decreased friction properties. It may be possible to form the polymeric strip 124 out of other suitable materials with similar physical properties, e.g. a metal like bronze. Each polymeric strip 124 extends substantially the length of the corresponding elongate channel 116 in which it is disposed.

Figure 4:
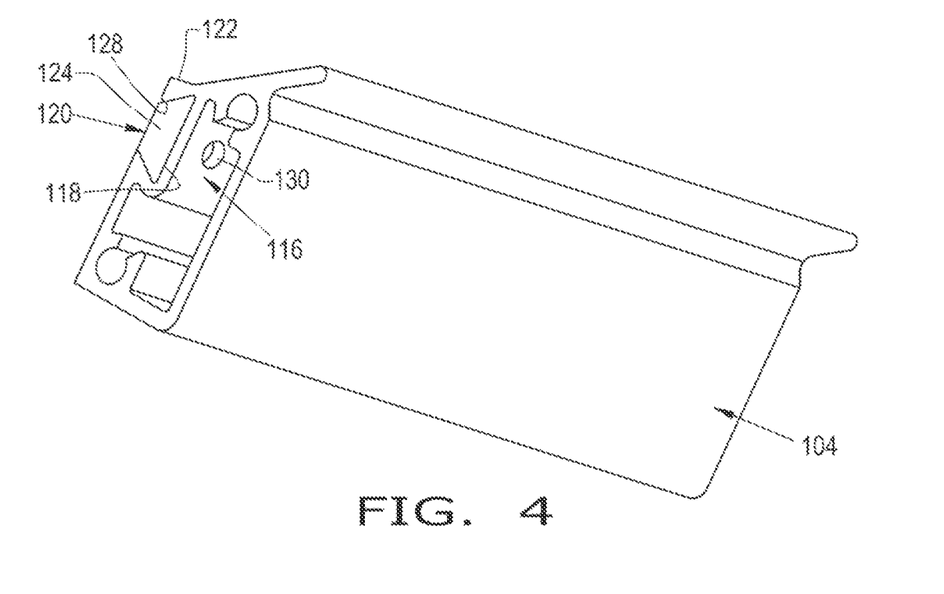
FIG. 4 is a perspective view of a portion of the side member shown in FIG. 3.

The strip 124 and the closed side 118 each include a plurality of aligned holes 130 extending generally orthogonally from the open side 120 (FIGS. 3 and 4). The respective wires 113 of the louvres 112 are rotatably carried within a corresponding one of the aligned holes 130. In contrast with a conventional sieve where the wires are rotatably carried in the thin plate steel of the side members, the plurality of aligned holes 130 in the polymeric strip 124 provide an increased surface area with low friction for rotatably carrying a respective one of the wires 113. This in turn increases the operational life of the louvres 112.

Figure 6:
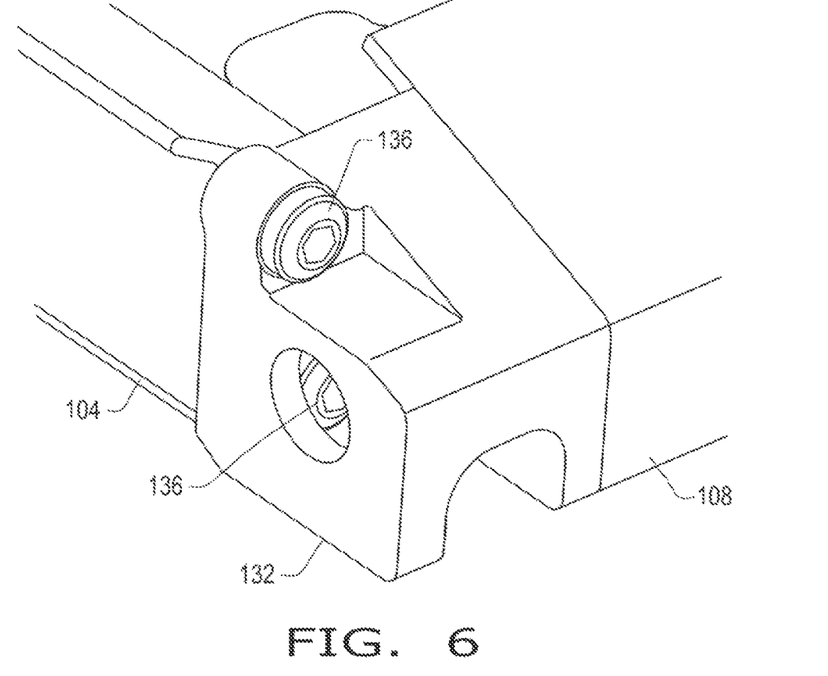
FIG. 6 is a perspective view of an embodiment of a corner piece of the present disclosure used for joining a side member with a cross member.
Figure 7:
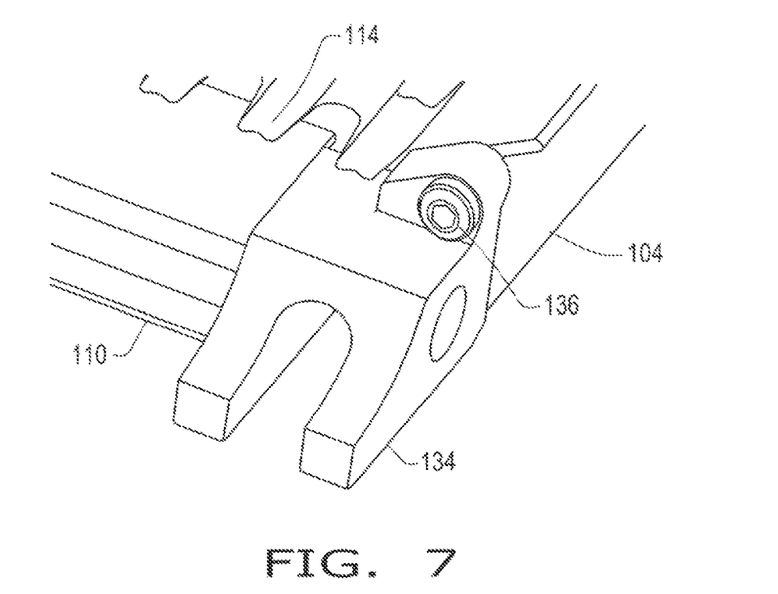
FIG. 7 is a perspective view of another embodiment of a corner piece of the present disclosure used for joining a side member with a cross member.

The framework 102 can further include a plurality of cast aluminum corner pieces 132, 134 which respectively interconnect one of the side members 104 with one of the cross members 108, 110 (FIGS. 6 and 7). Fasteners 136 fasten the corner pieces 132, 134 with the extruded side members 104. The corner piece 132 shown in FIG. 6 is at the front (downstream) end of the sieve assembly 100, and the corner piece 134 shown in FIG. 7 is at the rear (upstream) end of the sieve assembly 100. The cast aluminum corner pieces 132, 134 provide low weight, high strength corners for the framework 102.

During assembly of the framework 102, the strip 124 is slid into the elongate channel 116 and the deformable lip 122 is bent into compression against the strip 124. The holes 130 are drilled through the polymeric strip 124 and closed side 118 at predetermined spacings therebetween, corresponding to the configuration of the louvres 112. The wires 113 of the louvres 112 are placed into the corresponding aligned holes 130. The corner pieces 132, 134 are used to fasten the side members 104 and cross members 108, 110 together. The wires 113 of the louvres 112 can then be rotated within the aligned holes 130 with reduced friction and improved wear.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sieve for use in an agricultural harvester, the sieve comprising:
    a framework including a pair of opposed side members, wherein each of the opposed side members are comprised of (i) an extruded metal side member with a partially open elongate channel having a predefined cross section, and (ii) a strip having a mating cross section carried within the partially open elongate channel, wherein the partially open elongate channel has an open side and an opposing closed side, and the strip includes a hole that is aligned with a hole in the closed side, and wherein the aligned holes extend generally orthogonally from the open side and are spaced apart from each other; and
    a plurality of overlapped louvres extending between the pair of opposed side members, being overlapped relative to each other, and facing the open side of the partially open elongate channel, wherein the plurality of louvres each include a wire and a plurality of fingers attached to the wire, wherein one of the wires is rotatably carried within the aligned holes.

2. The sieve of claim 1, wherein the hole in the strip provides an increased surface area with low friction for rotatably carrying said one of the wires.

3. The sieve of claim 1, wherein the elongate channel includes a deformable lip extending between the closed side and the open side, the deformable lip being compressed against the strip to hold the strip in place within the elongate channel.

4. The sieve of claim 3, wherein the elongate channel has a generally trapezoidal shaped cross section.

5. The sieve of claim 1, wherein each strip extends substantially a length of the corresponding elongate channel.

6. The sieve of claim 1, wherein the strip comprises a polyamide strip or a bronze strip.

7. The sieve of claim 1, wherein the extruded metal side members comprise extruded aluminum side members.

8. The sieve of claim 1, wherein the framework further includes a pair of cross members extending between the side members, and further including a plurality of cast aluminum corner pieces, each of the corner pieces interconnecting one of the side members with one of the cross members.

9. An agricultural harvester comprising the sieve of claim 1.

10. The sieve of claim 1, wherein the extruded metal side member further comprises a second elongate channel, wherein a wall forming said closed side separates the second elongate channel from the partially open elongate channel.

11. The sieve of claim 10, wherein said one of the wires is at least partially positioned in said second elongate channel.

12. The sieve of claim 11, wherein said second elongate channel is a closed channel.

13. The sieve of claim 10, wherein said hole in said closed side is formed in said wall.

14. The sieve of claim 10, wherein the strip is elongated and has a trapezoidal cross-section having two opposing base sides and two non-parallel lateral sides, wherein a first base side of the two opposing base sides faces the strip and a second base side of the two opposing base sides faces the wall, and wherein the hole in the strip passes through both opposing base sides.

15. The sieve of claim 1, wherein each louvre extends in a longitudinal direction and the aligned holes are spaced apart along the longitudinal direction.

16. The sieve of claim 1, wherein said one of the wires passes through an entirety of the strip.

17. A method of assembling a sieve for use in an agricultural harvester comprising the steps of:
   inserting a strip within an elongate channel of an extruded metal side member, wherein the elongate channel has an open side and an opposing closed side, and the strip includes a hole that is aligned with a hole in the closed side, and wherein the aligned holes extend generally orthogonally from the open side and are spaced apart from each other;
   deforming a deformable lip of the extruded side member to fix the strip within the elongate channel;
   drilling holes through both the strip and the extruded side member. wherein the holes are aligned with each other; and
   mounting a rotatable louvre to the extruded metal side member by positioning a wire of the louvre through the aligned holes in the closed side and the strip such that the louvre faces the open side of the elongate channel.

* * * * *